Figure 1:
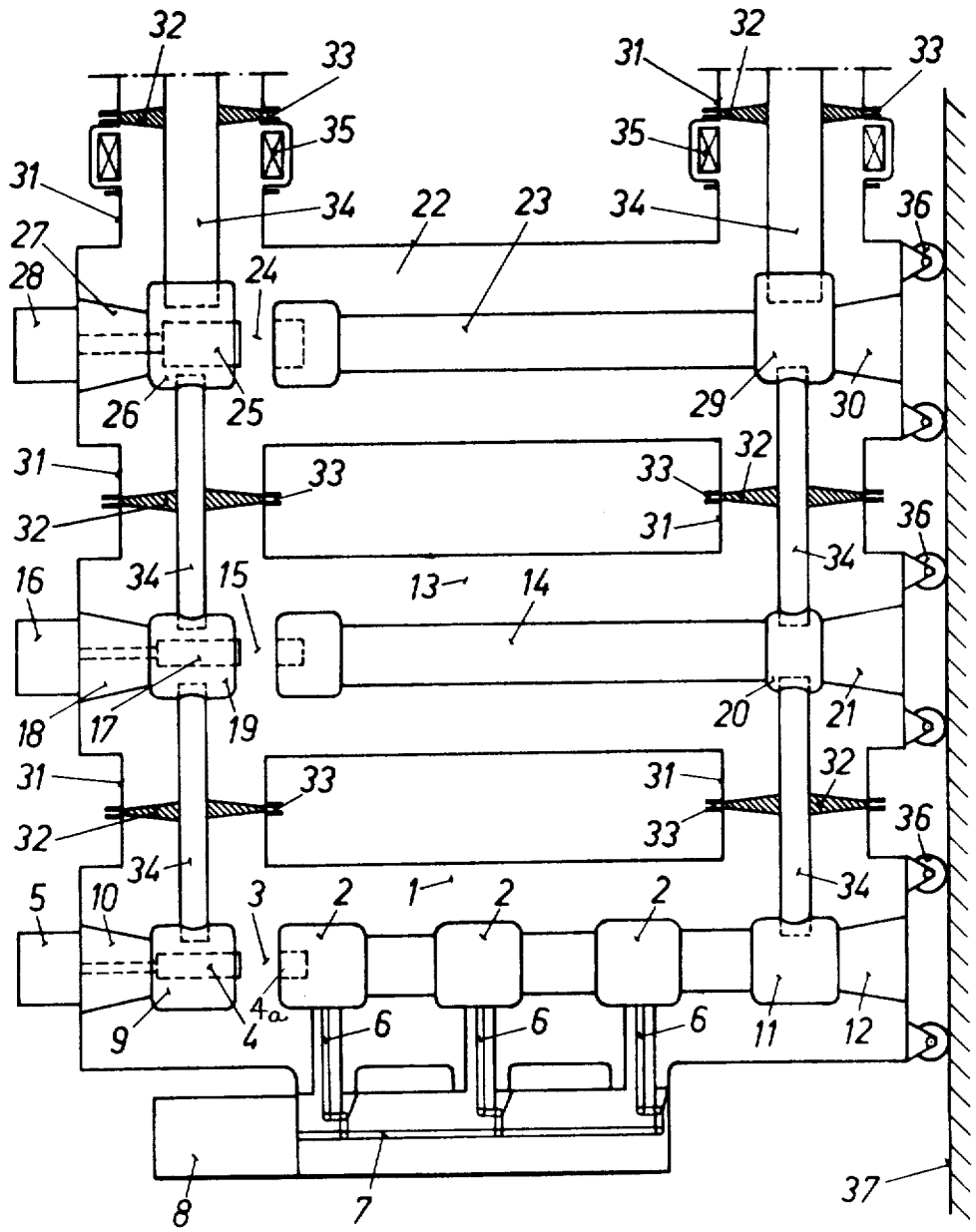

United States Patent

Mauthe

[15] 3,676,624
[45] July 11, 1972

[54] GAS BLAST POWER CIRCUIT BREAKER FOR HIGH OPERATING CURRENTS

[72] Inventor: Gerhard Mauthe, Wettingen, Switzerland
[73] Assignee: Aktiengesellschaft Brown, Boveri & Cie, Baden, Switzerland
[22] Filed: Sept. 24, 1970
[21] Appl. No.: 75,148

[30] Foreign Application Priority Data

Oct. 10, 1969 Switzerland ......................15236/69

[52] U.S. Cl. ........................................200/148 B, 200/145
[51] Int. Cl. ..........................................................H01h 33/54
[58] Field of Search...........................200/148 R, 148 B, 145

[56] References Cited

UNITED STATES PATENTS 3,348,001  10/1967  Upton, Jr. et al. ..................200/148 R

*Primary Examiner*—Robert S. Macon
*Attorney*—Pierce, Scheffler & Parker

[57] ABSTRACT

An electrical power circuit breaker assembly is constituted by a plurality of parallel arranged gas-filled tubular enclosed modules which respectively contain the various operating components. A plurality of power switching units and a voltage isolating switching unit, all connected in series constituting one such module, are located in one of the tubular enclosures and one or more of the other tubular enclosures contain other auxiliary modules such as a conductor bar which is connectible electrically in parallel with the series-connected power switching units through a disconnect switch to increase the rated current carrying capacity of the circuit breaker module during the period when the breaker contacts are closed by shunting current away from the latter. The parallel arranged tubular enclosed modules are interconnected at their ends by other tubular enclosure parts which enclose the necessary conducting members for electrically interconnecting the various modules and these latter enclosure parts include bulkhead insulators for sealing off the various parallel arranged gas-filled tubular enclosed modules each from the other.

3 Claims, 2 Drawing Figures

Inventor
Gerhard Mauthe

GAS BLAST POWER CIRCUIT BREAKER FOR HIGH OPERATING CURRENTS

The present invention relates to a gas blast power circuit breaker for high operating currents and having at least one current path containing at least one power switching point and a further current path having a current switching point connected in parallel to the power switching point and employing a high pressure gas filled metal enclosure which can be earthed.

It is known in electric gas blast circuit breakers for high operating currents to connect current carrying paths in parallel to the power switching points in order to minimize the physical dimensions of the said power switching points, said dimensions being defined by the appropriate dimensioning rules relating to the required current carrying capacity (nominal current). The parallel current paths are interrupted prior to the power switching points so that interruption takes place under wattless conditions and it is not necessary to provide measures for extinguishing the arc. The prior art furthermore discloses a high voltage gas blast circuit breaker of columnar construction in which each parallel current path is disposed in an enclosed insulated housing which is filled with high pressure gas (German Pat. specification No. 1,152,740). The prior art also discloses a circuit breaker suitable for medium voltages and high operating currents, for example 12000A, in particular a gas blast circuit breaker, in which two or more parallel switching points for conducting the load current, being free of extinction media and being constructed as open contact gaps, are adapted to open immediately prior to the power interruption point, all switching points being provided with their own pneumatic or hydraulic drives (German Utility Model No. 1,822,972). Finally, it is known to dispose busbars, transformers, switches and the like of electrical switchgear systems to be disposed in earthed, tubular enclosures in which the voltage carrying-parts are surrounded by a high pressure gas charge, for example $SF_6$.

SUMMARY OF THE INVENTION

It is the object of the invention to propose a gas blast circuit breaker of the kind mentioned heretofore, in which the rated current of a series of circuit breakers of different current carrying capacity can be simply increased so that the overall costs, in particular those due to the development of the circuit breaker, can be minimized. According to the invention this is achieved in that one or more conductive paths for connection in parallel with the contacts of the circuit breaker module and their individual switching points are each established as adjacently disposed, tubular enclosed modules, the tubular axes of which are parallel to each other, the enclosed modules being mechanically and electrically joined to each other by means of tubular interconnecting members whose axes extend approximately perpendicularly to those of the enclosed modules. A further advantage of this system is the ease of repair of the part apparatus disposed in the individual enclosed modules.

Figure 2:
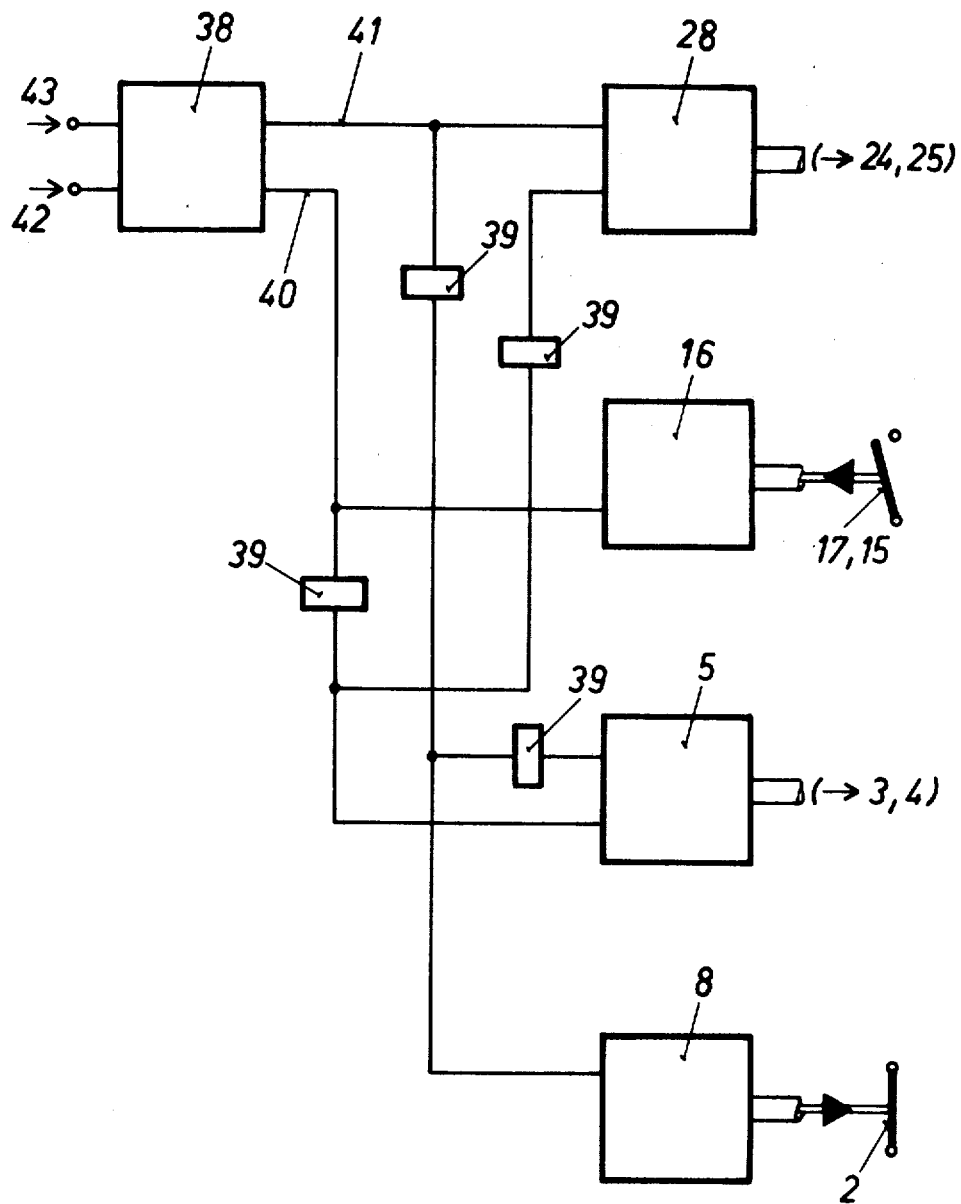

One embodiment of the invention will be explained here and below by reference to the accompanying drawings in which:

FIG. 1 is a partial section of a single pole circuit breaker with current paths for the power switching point, parallel current point and resistance switching point; and, FIG. 2 shows in diagrammatic form the control of the individual switching point drives.

The complete circuit breaker structure according to FIG. 1, comprises a circuit breaker module constituted by a gas-filled tubular casing 1 having disposed therein a plurality of serially connected power switching units 2 and a single voltage isolating switching unit 3 located at one end of the power switching units 2 and connected in series therewith. In accordance with conventional practice the operating sequence of the switches for a switching-out operation is such that the power switching units 2 open their contacts first so as to break the main power current, the contacts of the voltage isolating switching unit 3 then open to isolate the circuit, and then the contacts of the power switching units 2 re-close.

The movable contact member 4 of the voltage isolating switching unit 3 is operated by a drive 5 which can be of the hydraulic type. The contacts of the power switching units 2 are controlled by means of an operating linkage 6 and associated rocker levers by a common rod 7 which, in turn, is actuated by any suitable drive 8 such as a hydraulic one. Contact member 4 is supported by a conductive part 9 so as to slide therein relative to a stationary contact member 4a, and the supporting part 9 is carried by an insulator 10 secured to one end of the tubular casing 1 and through which an actuating rod for the contact member 4a passes to the drive 5. The opposite end of the assembly of series connected power switching units 2 is carried by a conductive part 11 supported by an insulator 12 secured to the other end of the casing 1. Adjoining the gas filled tubular casing 1, and parallel with it, is a conductive path for connection in parallel with the contacts of the circuit breaker module, this conductive path being likewise constructed in module form comprising another gas filled tubular casing 13 containing a resistor 14 and an associated auxiliary switching unit 15 having a movable contact 17 slidably arranged in a conductive part 19 supported by an insulator 18 secured to the adjacent end of the tubular casing 13. Numeral 16 denotes the drive for the contact member 17. In the selected embodiment, numerals 14, 15 refer to a make, i.e., switching-in resistance path. If necessary, and provided the resistor is suitably dimensioned and its associated auxiliary contact point is appropriately controlled, it is possible for the resistor to serve as a break, i.e., switching-out resistor or for both functions. On the other side the resistor 14 is provided with a terminal part 20 which is supported by an insulator 21. The casing 13 is adjoined by an still another conductive path for connection in parallel with the contacts of the circuit breaker module to serve as a shunt for the latter when the breaker contacts are closed, this conductive path being likewise constructed in module form comprising a casing 22 having disposed therein a parallel current path in the form of a conductor bar 23 with an associated switching contact point 24. The movable contact member 25 of the switching contact point 24 is supported in part 26 which in turn is supported by an insulator 27. The contact member 25 is operated by a drive 28. At the opposite end, the conductor bar 23 is connected to a part 29 and supported by insulator 30. The casing 1, 13, 22 are joined to each other by tubular intermediate members 31. These contain the bulkhead insulators 32 by means of which the casing 1, 13, 22 are separated from each other in a gas-tight manner.

The connecting position at the detachable flanges 33 is so constructed that the bulkhead insulators may be optionally left on one or the other enclosure part, to enable this to be closed in gas-tight manner when the circuit breaker is dismantled. The bulkhead insulators 32 are allowed to remain on the casing 13 if it is necessary, for example, to overhaul the enclosure modules 1 which contains the power circuit breaker 2,3. The ends of the bulkhead insulators 32 are provided with electrical connecting members 34, constructed as plugs, which are joined, permanently mechanically and in gas-tight manner to the bulkhead insulators 32. In the assembled state, the connecting members 34 are engaged with corresponding mating members in the parts 9, 11, 19, 20, 26 and 29. The two intermediate members 31, disposed on the side at which the circuit breaker is connected to the switchgear system, are provided with known toroid current transformers 35. The individual modules of the overall final assembly can be easily transported during installation or dismantling since they are provided with trolley wheels 36 which, in an appropriate embodiment, are adapted to roll on corresponding rails 37, installed on or in the earth soil. A changeover of the modular circuit breaker assembly from one current carrying rating to another can be easily accomplished merely by exchanging the shunt conductor module 22–23 different one having different resistance conditions. In this way it is possible to assemble circuit breakers with rated currents in steps of up to several $10^4$ A, having at the same time different contact resistance configurations, this being achieved without substantial development efforts.

FIG. 2 shows in diagrammatic form the control of the drives for the various contact positions. The electrical switching commands, the numeral 42 referring to the "make" command while the numeral 43 refers to the "break" command, are converted in a central control system 38 into corresponding hydraulic commands. The "make" HYDRAULIC LINE IS DESIGNATED WITH THE NUMERAL 40 AND THE "break" HYDRAULIC LINE IS DESIGNATED WITH THE NUMERAL 41. These hydraulic lines extend to the drives 5, 8, 16, 28 of the contact points 3, 2, 15, 24, as already explained by reference to FIG. 1. Pulse delay elements 39 are incorporated at certain positions to ensure that the contact points always operate in the correct sequence. For example, in a switching out "break" cycle, the parallel current switching point 24 opens first, the rapidly opening power switching points 2 then open with delay and the voltage isolation point 3 opens slightly later. On "making", i.e., on switching in, the auxiliary resistance switching point 15 closes first but remains closed only for a short period while the voltage isolation point 3 finally closes with delay.

I claim:

1. In a modular circuit breaker assembly, the combination comprising a circuit breaker module which includes at least one power switching point connected in series with a voltage isolation switching point, said power switching and voltage isolation switching points being located within a tubular casing, a shunt conductor module connectible in parallel with said circuit breaker module for relieving the circuit breaker contacts of current when said contacts are closed, said shunt conductor module including a conductor bar connected in series with a switching unit and being located within a tubular casing extending parallel with the tubular casing of said circuit breaker module, other tubular casings located at the opposite ends of and at a right angle to the casings correlated to said circuit breaker and shunt conductor modules and which are interconnected therewith by means including bulkhead insulators and joints serving to isolate the casings of said modules from one another, and plug-in type conductor means supported by said bulkhead insulators for effecting the electrically parallel connection between said shunt conductor and circuit breaker modules.

2. A modular circuit breaker assembly as defined in claim 1 and which further includes a shunt resistor module also connectible in parallel with said circuit breaker module, said shunt resistor module including a resistance element connected in series with a switching unit and being located within a tubular casing extending parallel with and also joined to the ends of the tubular casing of said circuit breaker module by means of other tubular casing structure at a right angle thereto including joints and bulkhead insulators therein and plug-in conductor means supported by said insulators for effecting the said parallel connection between said circuit breaker and resistance modules.

3. A modulator circuit breaker assembly as defined in claim 1 and wherein said shunt conductor and circuit breaker modules are independently mounted for transport.

* * * * *